United States Patent
Wei et al.

(10) Patent No.: US 10,689,259 B2
(45) Date of Patent: Jun. 23, 2020

(54) METHOD FOR REPAIRING SURFACE OF CARBON NANOTUBE ARRAY

(71) Applicants: Tsinghua University, Beijing (CN); HON HAI PRECISION INDUSTRY CO., LTD., New Taipei (TW)

(72) Inventors: Yang Wei, Beijing (CN); Guang Wang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/382,413

(22) Filed: Apr. 12, 2019

(65) Prior Publication Data
US 2020/0140278 A1 May 7, 2020

(30) Foreign Application Priority Data
Nov. 1, 2018 (CN) .......................... 2018 1 1298971

(51) Int. Cl.
*C01B 32/168* (2017.01)

(52) U.S. Cl.
CPC ........ *C01B 32/168* (2017.08); *C01B 2202/08* (2013.01); *C01P 2004/03* (2013.01); *C01P 2004/13* (2013.01)

(58) Field of Classification Search
CPC ..... C01B 2202/00; C01B 32/00; C01B 32/15; C01B 32/152; C01B 32/154; C01B 32/156; C01B 32/158; C01B 32/16; C01B 32/162; C01B 32/164; C01B 32/166; C01B 32/17; C01B 32/172; C01B 32/174;
(Continued)

(56) References Cited

U.S. PATENT DOCUMENTS

| | | | |
|---|---|---|---|
| 6,436,221 B1 * | 8/2002 | Chang | B82Y 10/00 156/247 |
| 7,195,938 B2 * | 3/2007 | Yaniv | B82Y 10/00 156/247 |

(Continued)

OTHER PUBLICATIONS

T.J. Vink, 'Enhanced field emission from printed carbon nanotubes by mechanical modification', 2003, J. Appl. Phys. Lett. 83, pp. 3552-3554 (Year: 2003).*
(Continued)

*Primary Examiner* — Michael N Orlando
*Assistant Examiner* — Abhishek A Patwardhan
(74) *Attorney, Agent, or Firm* — ScienBiziP, P.C.

(57) ABSTRACT

A method for repairing surface of carbon nanotube array is provided. A carbon nanotube array located on a substrate are provided. The carbon nanotube array comprises a plurality of carbon nanotubes, and at least part of the plurality of carbon nanotubes are aslant arranged on the surface of the substrate. An adhesive tape is placed on a surface of the carbon nanotube array away from the substrate. A bond force between the plurality of carbon nanotubes and the substrate is greater than a bond force between the plurality of carbon nanotubes and the adhesive tape. The adhesive tape is peeled off, and the at least part of the plurality of carbon nanotubes are pulled up vertically by a bond force of the adhesive tape.

15 Claims, 9 Drawing Sheets

(58) Field of Classification Search
CPC ... C01B 32/176; C01B 32/178; C01B 32/168; C01B 2202/08; C01P 2004/03; C01P 2004/13
USPC .......................................................... 156/247
See application file for complete search history.

(56) References Cited

U.S. PATENT DOCUMENTS

| | | | | |
|---|---|---|---|---|
| 8,057,901 | B2* | 11/2011 | Ford | B82Y 30/00 |
| | | | | 252/500 |
| 8,404,074 | B2* | 3/2013 | Pei | B32B 37/24 |
| | | | | 156/279 |
| 8,513,870 | B2* | 8/2013 | Lee | H01J 1/304 |
| | | | | 313/293 |
| 2004/0191698 | A1* | 9/2004 | Yagi | B82Y 10/00 |
| | | | | 430/320 |
| 2012/0251766 | A1* | 10/2012 | Jiang | B32B 27/38 |
| | | | | 428/114 |

OTHER PUBLICATIONS

Kyung, 'The effect of Ar neutral beam treatment of screen-printed carbon nanotubes for enhanced field emission', 2007, J. Appl. Phys. 101, 083305, pp. 1-5 (Year: 2007).*

Kyung, 'The effect of atmospheric pressure plasma treatment on the field emission characteristics of screen printed carbon nanotubes', 2006, Elsevier, vol. 45 Issue 3, pp. 649-654 (Year: 2006).*

* cited by examiner

METHOD FOR REPAIRING SURFACE OF CARBON NANOTUBE ARRAY

CROSS-REFERENCE TO RELATED APPLICATIONS

This application claims all benefits accruing under 35 U.S.C. § 119 from China Patent Application No. 201811298971.3, filed on Nov. 1, 2018, in the China National Intellectual Property Administration, the contents of which are hereby incorporated by reference. The application is also related to copending applications entitled, "METHOD OF MAKING FIELD EMITTER", filed Apr. 24, 2019 Ser. No. 16/393,282. The application is also related to copending applications entitled, "METHOD FOR MAKING BLACKBODY RADIATION SOURCE", filed Apr. 12, 2019 Ser. No. 16/382,408. The application is also related to copending applications entitled, "METHOD FOR TRANSFERRING CARBON NANOTUBE ARRAY", filed Apr. 17, 2019 Ser. No. 16/387,158.

FIELD

The present disclosure relates to a method for repairing surface of carbon nanotube array.

BACKGROUND

Carbon nanotubes (CNTs) are an allotrope of carbon with a cylindrical nanostructure. CNTs exhibit extraordinary strength and unique electrical properties, and are efficient conductors of heat. Carbon nanotube array is formed by a plurality of carbon nanotubes growing in perpendicular with a substrate, and the carbon nanotube array can exert excellent electrical conduction and heat conduction in an axial direction of the carbon nanotube. The carbon nanotube array can be applied to many fields such as field emitters and blackbody sources.

However, during making, storing or transporting carbon nanotube arrays, the carbon nanotubes of carbon nanotube arrays can be easily tilted, bent, or become entangled together, and thus a surface of the carbon nanotube array is uneven and defects are increased.

Therefore, there is a need to provide a method for repairing surface of carbon nanotube array, the method makes the carbon nanotubes in the carbon nanotube array perpendicular to a substrate and flattens the surface of the carbon nanotube array.

BRIEF DESCRIPTION OF THE DRAWINGS

Implementations of the present technology will now be described, by way of embodiments, with reference to the attached figures, wherein.

DETAILED DESCRIPTION

Figure 1:
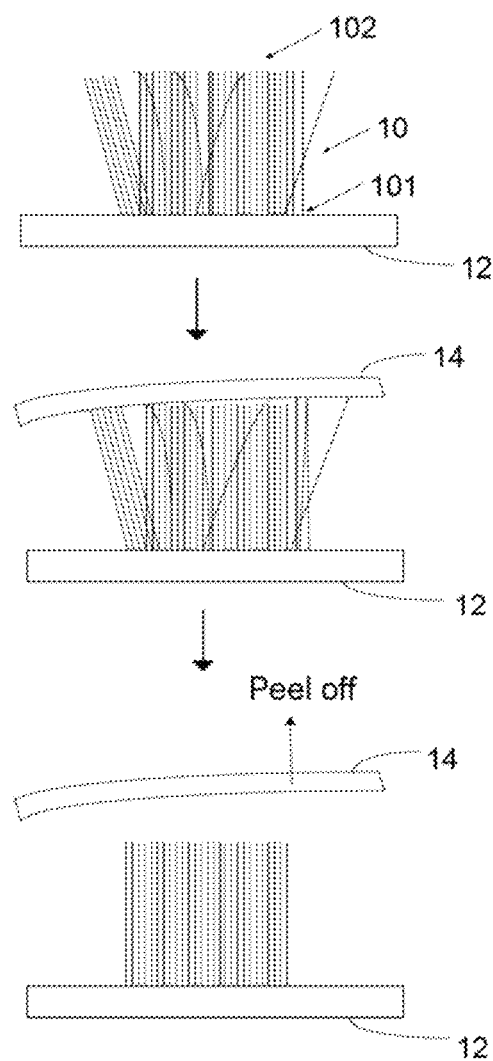
FIG. 1 is a process diagram of one embodiment of a method for repairing surface of carbon nanotube array.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature which is described, such that the component need not be exactly or strictly conforming to such a feature. The term "comprise," when utilized, means "include, but not necessarily limited to"; it specifically indicates open-ended inclusion or membership in the so-described combination, group, series, and the like.

Figure 2:
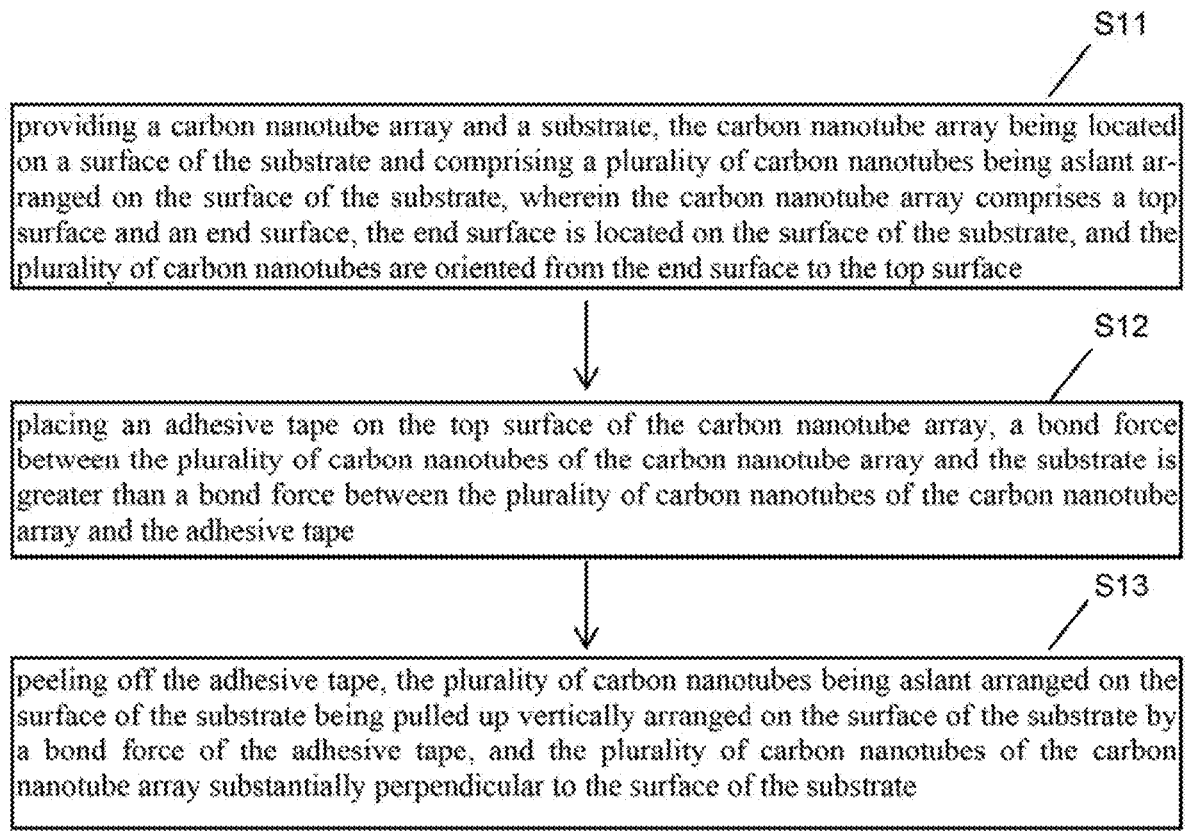
FIG. 2 is a flow diagram of the method for repairing surface of carbon nanotube array in FIG. 1.

FIG. 1 and FIG. 2 illustrate a method for repairing surface of carbon nanotube array of one embodiment. The method for repairing surface of carbon nanotube array comprises:

step (S11), providing a carbon nanotube array 10 and a substrate 12, the carbon nanotube array 10 being located on a surface of the substrate 12 and comprising a plurality of carbon nanotubes being aslant arranged on the surface of the substrate 12, wherein the carbon nanotube array 10 comprises a top surface 102 and an end surface 101, the end surface 101 is located on the surface of the substrate 12, and the plurality of carbon nanotubes are oriented from the end surface 101 to the top surface 102;

step (S12), placing an adhesive tape 14 on the top surface 102 of the carbon nanotube array 10, a bond force between the plurality of carbon nanotubes of the carbon nanotube array 10 and the substrate 12 is greater than a bond force between the plurality of carbon nanotubes of the carbon nanotube array 10 and the adhesive tape 14; and step (S13), peeling off the adhesive tape 14, the plurality of carbon nanotubes being aslant arranged on the surface of the substrate 12 being pulled up vertically arranged on the surface of the substrate 12 by a bond force of the adhesive tape 14, and the plurality of carbon nanotubes of the carbon nanotube array 10 substantially perpendicular to the surface of the substrate 12.

In step (S11), the plurality of carbon nanotubes being aslant arranged on the surface of the substrate 12, meaning that the extension directions of the plurality of carbon nanotubes are not perpendicular to the surface of the substrate 12.

The carbon nanotube array 10 can be grown on the substrate 12 directly. The carbon nanotube array 10 can also be transferred from its growth substrate to the substrate 12. When the carbon nanotube array 10 is transferred from its growth substrate to the substrate 12, the carbon nanotube array 10 can be bonded to the substrate 12 by an adhesive layer, and a bond force between the plurality of carbon nanotubes of the carbon nanotube array 10 and the adhesive layer is greater than the bond force between the plurality of carbon nanotubes of the carbon nanotube array 10 and the adhesive tape 14.

In one embodiment, the carbon nanotube array is pure, referring that the carbon nanotube array contains no measurable amount of impurities, such as amorphous carbon, residual catalyst metal particles or the like. The carbon nanotubes of the carbon nanotube array are joined with each other by Van der Waals forces to form an array.

A method for making the carbon nanotube array can be a chemical vapor deposition (CVD) method, an arc discharge preparation method, or an aerosol preparation method. In one embodiment, the carbon nanotube array is directly grown on the substrate 12 by the chemical vapor deposition (CVD) method. The chemical vapor deposition (CVD) method comprises the steps of (a) providing the substrate 12. Then (b) forming a catalyst layer on a surface of the substrate 12, in which a material of the catalyst layer can be selected from the group consisting of iron (Fe), cobalt (Co), nickel (Ni) and alloy of any combination thereof. Step (c) is annealing the substrate with the catalyst layer in air at 700° C. to 900° C. for about 30 minutes to 90 minutes and (d) disposing the substrate 12 in a reaction chamber. The reaction chamber is heated in protective gas to 500° C.~740° C., and a carbon source gas is introduced into the reaction chamber for about 5 minutes to about 30 minutes. The carbon nanotube array is grown from the substrate 12. A height of the carbon nanotube of the super-aligned carbon nanotube array is ranged from about 200 micrometers to about 650 micrometers. The carbon source gas can be chemically active hydrocarbons, such as acetylene. The protective gas can be nitrogen, ammonia, or an inert gas. Examples of the method of making the carbon nanotube array are taught by U.S. Pat. No. 7,045,108 to Jiang et al.

An end of each of the plurality of carbon nanotubes of the carbon nanotube array 10 adjacent to the substrate 12 is defined as a bottom end. An end of each of the plurality of carbon nanotubes of the carbon nanotube array 10 away from the substrate 12 is defined as a top end. The end surface 101 is formed by the bottom ends of the plurality of carbon nanotubes of the carbon nanotube array 10. The top surface 102 is formed by the top ends of the plurality of carbon nanotubes of the carbon nanotube array 10.

The surface of the substrate 12 is flat and smooth. A material of the substrate 12 can be flexible or rigid. For example, the material of the first substrate 10 can be tape, metal, glass, plastic, silicon wafer, silicon dioxide sheet, quartz sheet, polymethyl methacrylate (PMMA), or polyethylene terephthalate (PET). When the carbon nanotube array 10 is grown on the substrate 12 directly, the material of the substrate 12 can be P-type silicon, N-type silicon, silicon oxide with an oxide layer or quartz with an oxide layer. In one embodiment, the carbon nanotube array 10 is grown on the substrate 12 directly, and the substrate 12 is a silicon wafer.

In step (S12), the bond force between the adhesive tape 14 and the plurality of carbon nanotubes of the carbon nanotube array 10 is less than the bond force between the plurality of carbon nanotubes of the carbon nanotube array 10 and the substrate 12. The adhesive tape 14 can be biaxial stretching polypropylene (BOPP) tape, cloth tape, Kraft paper tape, masking tape, fiber tape, polyvinyl chloride (PVC) tape, polyethylene (PE) tape, or the like. In one embodiment, the adhesive tape 14 is the PVC tape. In one embodiment, an area of the adhesive tape 14 is greater than or equal to an area of the top surface 102 of the carbon nanotube array 10.

In step (S13), during peeling off the adhesive tape 14, a peeling direction of the adhesive tape 14 is perpendicular to the top surface 102 of the carbon nanotube array 10. Placing the adhesive tape 14 on the top surface 102 of the carbon nanotube array 10, the top ends of the plurality of carbon nanotubes of the carbon nanotube array 10 are bonded to the adhesive tape 14. Since the bond force between the adhesive tape 14 and the plurality of carbon nanotubes of the carbon nanotube array 10 is less than the bond force between the plurality of carbon nanotubes of the carbon nanotube array 10 and the substrate 12, when the adhesive tape 14 is peeled off in a vertical direction of the top surface 102, the plurality of carbon nanotubes being aslant arranged on the surface of the substrate 12 are pulled up vertically and perpendicular to the surface of the substrate 12, and the plurality of carbon nanotubes of the carbon nanotube array 10 is not separated from the substrate 12.

After the step (S13), the plurality of carbon nanotubes of the carbon nanotube array become arranged vertically and is substantially perpendicular to the surface of the substrate 12, wherein a large number of the plurality of carbon nanotubes of the carbon nanotube array 10 are perpendicular to the surface of the substrate 12, and a minority of plurality of carbon nanotubes of the carbon nanotube array may be inclined. However, the amount of inclined carbon nanotubes is small and does not affect the overall directional properties of the majority of carbon nanotubes in the carbon nanotube array.

After the carbon nanotube array 10 is repaired by the method for repairing surface of carbon nanotube array, the carbon nanotube array 10 becomes a super-aligned carbon nanotube array. That is, after peeling off the adhesive tape 14, all the carbon nanotubes of the carbon nanotube array 10 forms the super-aligned carbon nanotube array on the surface of the substrate 12. The super-aligned carbon nanotube array comprises a plurality of carbon nanotubes, the plurality of carbon nanotubes are substantially parallel to each other and perpendicular to the surface of the substrate 12. The plurality of carbon nanotubes of the super-aligned carbon nanotube array is joined with each other by Van der Waals forces to form an array.

Figure 3:
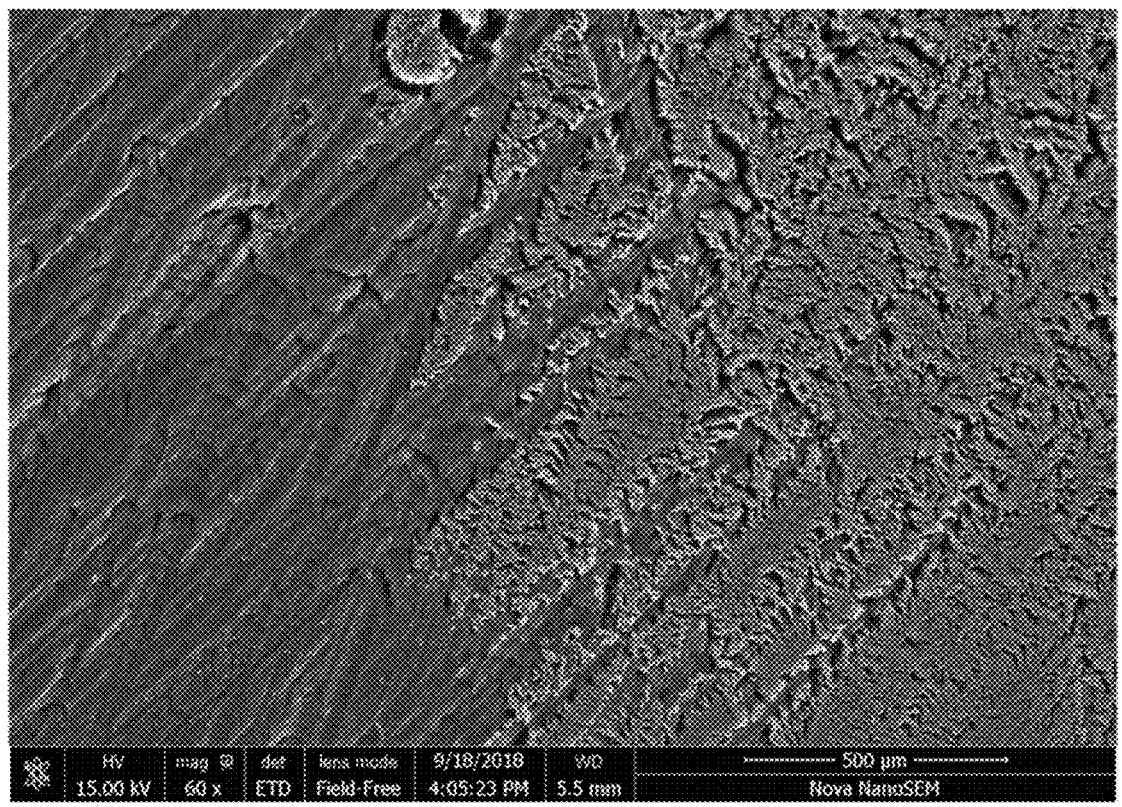
FIG. 3 is a scanning electron micrograph (SEM) image of a carbon nanotube array before being repaired.
Figure 4:
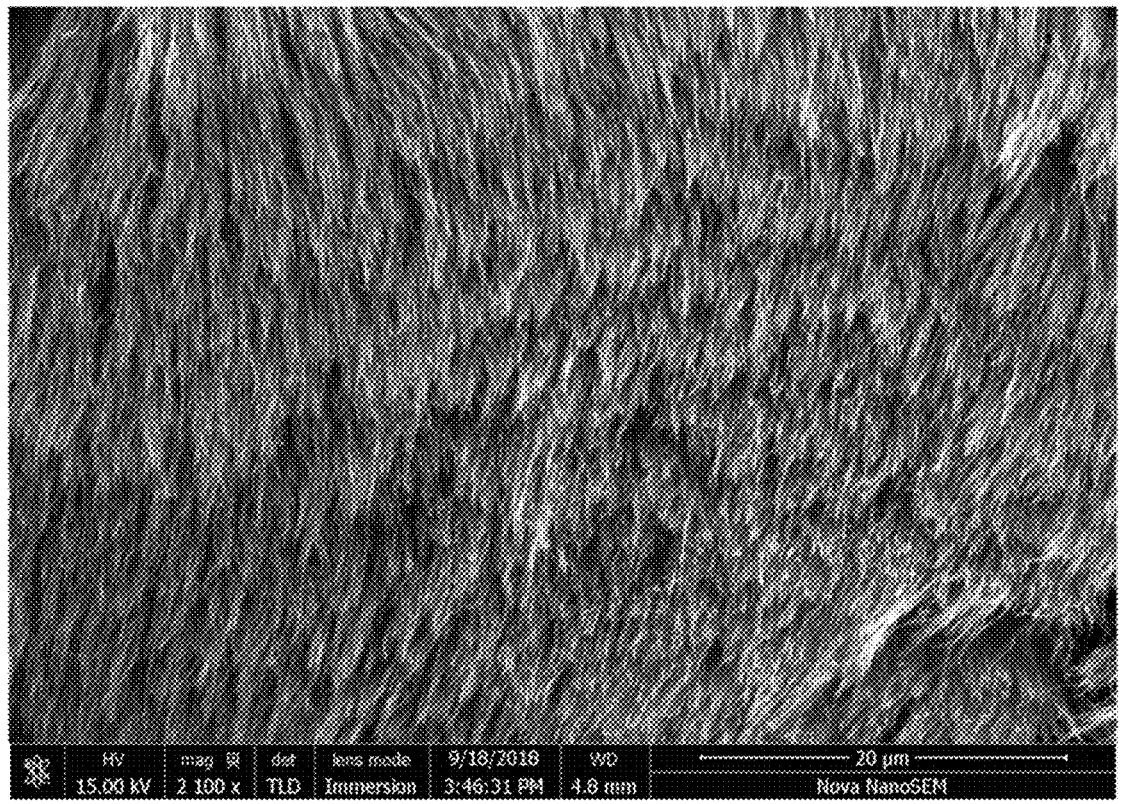
FIG. 4 is an SEM image of the carbon nanotube array in FIG. 3 after being repaired by the method in FIG. 1.

FIG. 3 shows a scanning electron micrograph (SEM) image of the carbon nanotube array before being repaired. It can be seen that a part of the plurality of the carbon nanotubes of the carbon nanotube array are inclined, and the surface of the carbon nanotube array is uneven. FIG. 4 shows an SEM image of the carbon nanotube array in FIG. 3 after being repaired by the method as disclosed in FIGS. 1 and 2. It can be seen that the plurality of carbon nanotubes of the carbon nanotube array are not inclined, and the surface of the carbon nanotube array is level. It illustrates that the method for repairing surface of carbon nanotube array can make the inclined carbon nanotubes of the carbon nanotube array re-perpend perpendicular to the substrate, thereby making the surface of the carbon nanotube array level.

In one embodiment, the step (S12) and step (S13) are repeated a plurality of times, the plurality of carbon nanotubes being aslant arranged on the surface of the substrate 12 are all straightened, so that the plurality of carbon nanotubes of the carbon nanotube array after being repaired are perpendicular to the substrate 12, and the surface of the carbon nanotube array 10 is level.

In one embodiment, the method for repairing surface of carbon nanotube array further comprises a step of plasma treating the top surface 102 of the carbon nanotube array 10 after step (S13), to remove residual adhesive on the top surface of the carbon nanotube array 10.

Figure 5:
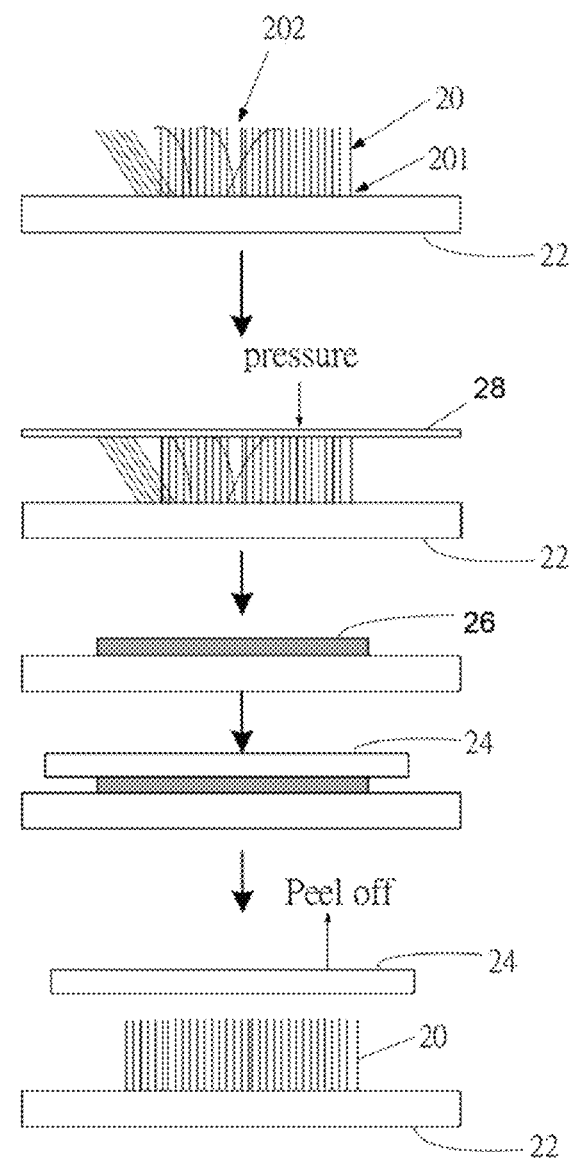
FIG. 5 is a process diagram of one embodiment of a method for repairing surface of carbon nanotube array.
Figure 6:
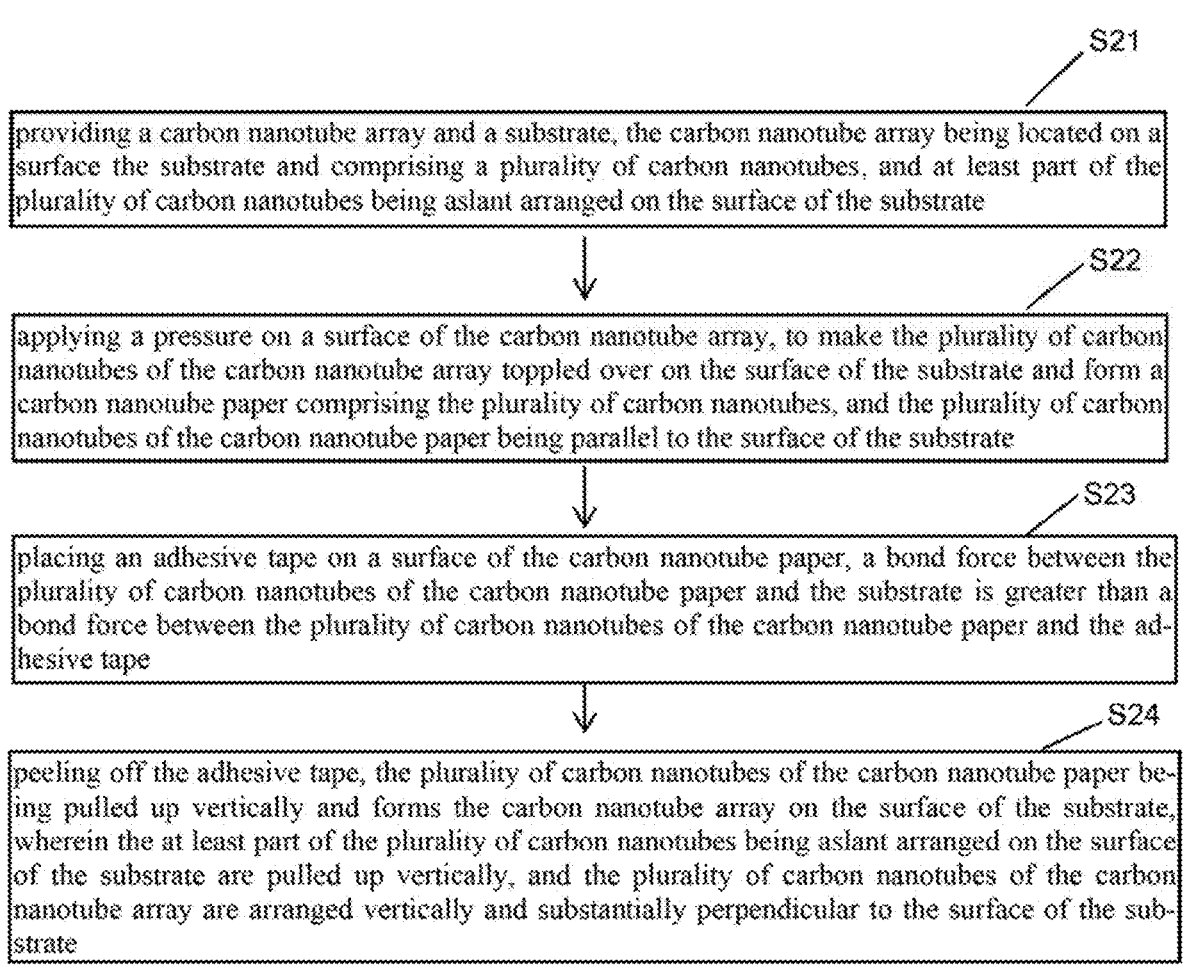
FIG. 6 is a flow diagram of the method for repairing surface of carbon nanotube array in FIG. 5.

FIG. 5 and FIG. 6 illustrate a method for repairing surface of carbon nanotube array of one embodiment. The method for repairing surface of carbon nanotube array comprises:

step (S21), providing a carbon nanotube array 20 and a substrate 22, the carbon nanotube array 20 being located on a surface the substrate 22 and comprising a plurality of carbon nanotubes, and at least part of the plurality of carbon nanotubes being aslant arranged on the surface of the substrate 22;

step (S22), applying a pressure on a surface of the carbon nanotube array 20, to make the plurality of carbon nanotubes of the carbon nanotube array 20 toppled over on the surface of the substrate 22 and form a carbon nanotube paper 26 comprising the plurality of carbon nanotubes, and the plurality of carbon nanotubes of the carbon nanotube paper 26 being parallel to the surface of the substrate 22;

step (S23), placing an adhesive tape 24 on a surface of the carbon nanotube paper 26, a bond force between the plurality of carbon nanotubes of the carbon nanotube paper 26 and the substrate 22 is greater than a bond force between the plurality of carbon nanotubes of the carbon nanotube paper 26 and the adhesive tape 24; and step (S24), peeling off the adhesive tape 24, the plurality of carbon nanotubes of the carbon nanotube paper 26 being pulled up vertically and forms the carbon nanotube array 10 on the surface of the substrate 22, wherein the at least part of the plurality of carbon nanotubes being aslant arranged on the surface of the substrate 22 are pulled up vertically, and the plurality of carbon nanotubes of the carbon nanotube array 20 are arranged vertically and substantially perpendicular to the surface of the substrate 22.

In step (S21), the carbon nanotube array 20 is the same as the carbon nanotube array, the substrate 22 is the same as the substrate 12, the adhesive tape 24 is the same as the adhesive tape 14.

In one embodiment, the carbon nanotube array 20 is transferred from its growth substrate to the substrate 22, the carbon nanotube array 20 is bonded to the substrate 22 by an adhesive layer, and a bond force between the plurality of carbon nanotubes of the carbon nanotube array 20 and the adhesive layer is greater than the bond force between the plurality of carbon nanotubes of the carbon nanotube array 20 and the adhesive tape 24.

After the step (S22), the at least part of the plurality of carbon nanotubes become aslant arranged on the surface of the substrate 22, wherein the extension directions of the at least part of the plurality of carbon nanotubes are not perpendicular to the surface of the substrate 22.

An end of each of the plurality of carbon nanotubes of the carbon nanotube array 20 adjacent to the substrate 22 is defined as a bottom end. An end of each of the plurality of carbon nanotubes of the carbon nanotube array 20 away from the substrate 22 is defined as a top end. A surface formed by the bottom ends of the plurality of carbon nanotubes of the carbon nanotube array 20 is defined as an end surface 201. A surface formed by the top ends of the plurality of carbon nanotubes of the carbon nanotube array 20 is defined as a top surface 202. The plurality of carbon nanotubes of the carbon nanotube array 20 are oriented from the end surface 201 to the top surface 202.

Applying the pressure on the top surface 202 of the carbon nanotube array 20 by a pressure providing device 28. The pressure providing device 28 can be a roller or a plate but not limited to them. When the pressure providing device 28 is the roller, the roller can roll counterclockwise or clockwise on the top surface 202. When the pressure providing device 28 is the plate, an angle between a direction of applying the pressure and the top surface 202 is from 0 degree to about 90 degrees. In one embodiment, the angle between the direction of applying the pressure and the top surface 202 is greater than or equal to 30 degrees and less than or equal to 60 degrees. The surface of the plate or roller in contact with the carbon nanotube array 20 is a flat surface and is not sticky. A material of the plate or roller is not limited. The material of the plate or roller can be metal such as steel and iron. The material of the plate or roller can also be non-metal such as glass, silicon plate, and diamond. In one embodiment, applying the pressure to the surface of the carbon nanotube array 20 by a glass plate, and the angle between the direction of applying the pressure and the top surface 202 is about 45 degrees.

If the pressure applied to the surface of the carbon nanotube array 20 is too large, the plurality of carbon nanotubes of the carbon nanotube array 20 are easily damaged; if the pressure applied to the surface of the carbon nanotube array 20 is too small, the carbon nanotube paper 26 can not be formed. In one embodiment, the pressure applied to the surface of the carbon nanotube array 20 is about 20 Newton.

Figure 7:
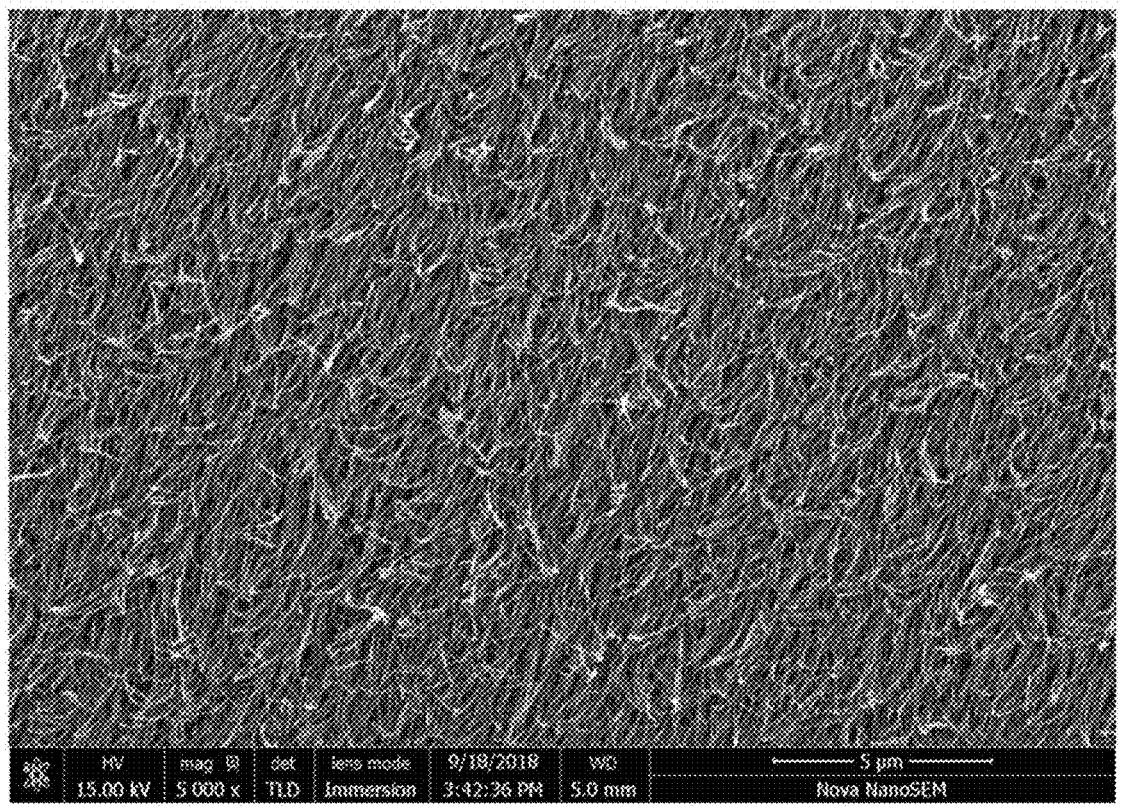
FIG. 7 is an SEM image of a carbon nanotube paper.

In one embodiment, the pressure providing device 28 applies pressure to the carbon nanotube array 20 in one direction, and the plurality of carbon nanotubes of the carbon nanotube array 20 are toppled over in one direction, therefore, the plurality of carbon nanotubes in the carbon nanotube paper 26 are aligned in the same direction. It is advantageous to vertically bond the plurality of carbon nanotubes in the carbon nanotube paper 26 to form the carbon nanotube array 20 during peeling off the adhesive tape 24. FIG. 7 shows an electron micrograph of one embodiment of the carbon nanotube paper 60.

In step (S23), the bottom end of the plurality of carbon nanotubes of the carbon nanotube array 20 is defined as a first end, the top end of the plurality of carbon nanotubes of the carbon nanotube array 20 is defined as a second end. In one embodiment, after the adhesive tape 24 is placed on the surface of the carbon nanotube paper 26, the adhesive tape 24 can be further pressed to better bond the second end of the plurality of carbon nanotubes of the carbon nanotube paper 26 to the adhesive tape 24.

In step (S24), during peeling off the adhesive tape 24, a peeling direction of the adhesive tape 24 is perpendicular to the surface of the substrate 22. Placing the adhesive tape 24 on the top surface 202 of the carbon nanotube array 20, the second ends of the plurality of carbon nanotubes of the carbon nanotube paper 26 are bonded to the adhesive tape 24. Since the bond force between the adhesive tape 24 and the plurality of carbon nanotubes is less than the bond force between the plurality of carbon nanotubes and the substrate 22, when the adhesive tape 24 is peeled off in a vertical direction of the top surface 202, the plurality of carbon nanotubes are pulled up vertically and is not separated from the substrate 22, and the at least part of the plurality of carbon nanotubes being aslant arranged on the surface of the substrate 22 are pulled up vertically and perpendicular to the surface of the substrate 22.

The plurality of carbon nanotubes of the carbon nanotube array 20 are arranged vertically and substantially perpendicular to the surface of the substrate 22, meaning that a large number of the plurality of carbon nanotubes of the carbon nanotube array 20 are perpendicular to the surface of the substrate 22, and a minority of the plurality of carbon nanotubes of the carbon nanotube array may be inclined. However, the amount of inclined carbon nanotubes is very small and does not affect the overall directional properties of the majority of carbon nanotubes in the carbon nanotube array.

After the carbon nanotube array 20 is repaired by the method for repairing surface of carbon nanotube array, the carbon nanotube array 20 is a super-aligned carbon nanotube array. That is, after peeling off the adhesive tape 24, all the carbon nanotubes of the carbon nanotube array 20 forms the super-aligned carbon nanotube array on the surface of the substrate 22. The super-aligned carbon nanotube array comprises a plurality of carbon nanotubes, the plurality of carbon nanotubes are substantially parallel to each other and perpendicular to the surface of the substrate 22. The plurality of carbon nanotubes of the super-aligned carbon nanotube array is joined with each other by Van der Waals forces to form an array.

In one embodiment, the method for repairing surface of carbon nanotube array further comprises a step of plasma treating the top surface 202 of the carbon nanotube array 20 after step (S24), to remove residual adhesive on the top surface of the carbon nanotube array 20.

Figure 8:
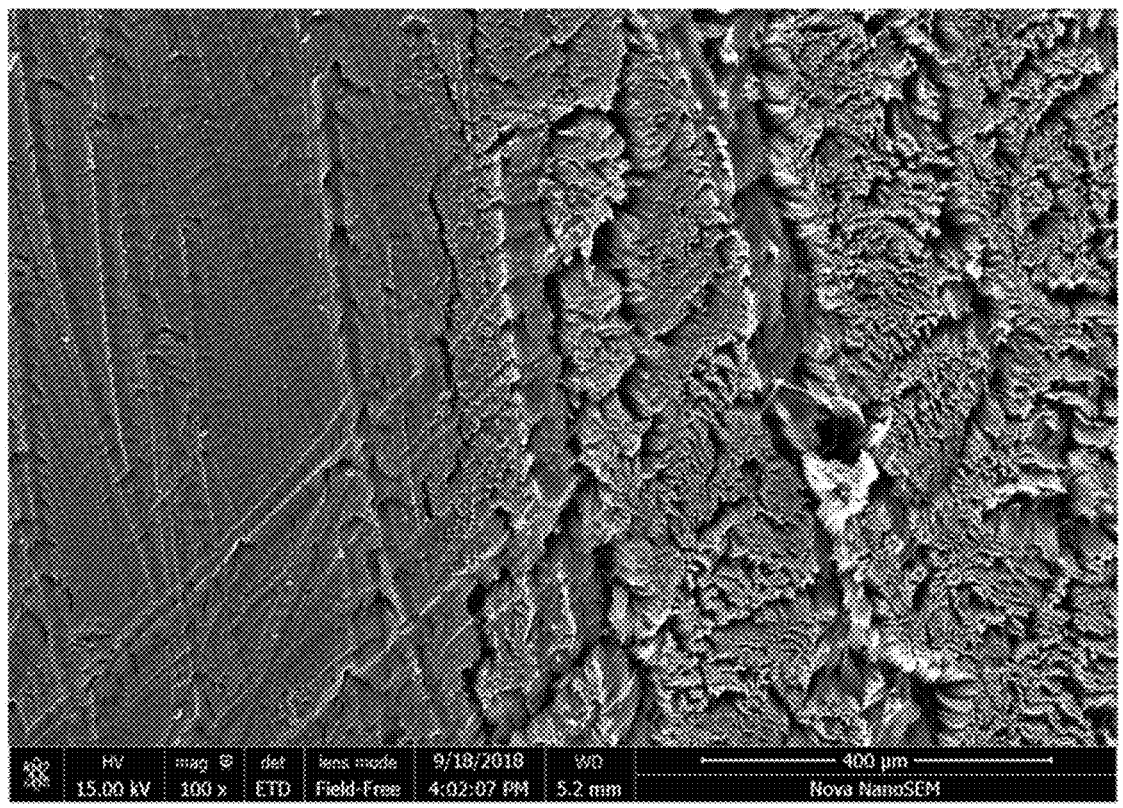
FIG. 8 is an SEM image of one embodiment of a carbon nanotube array before being repaired.
Figure 9:
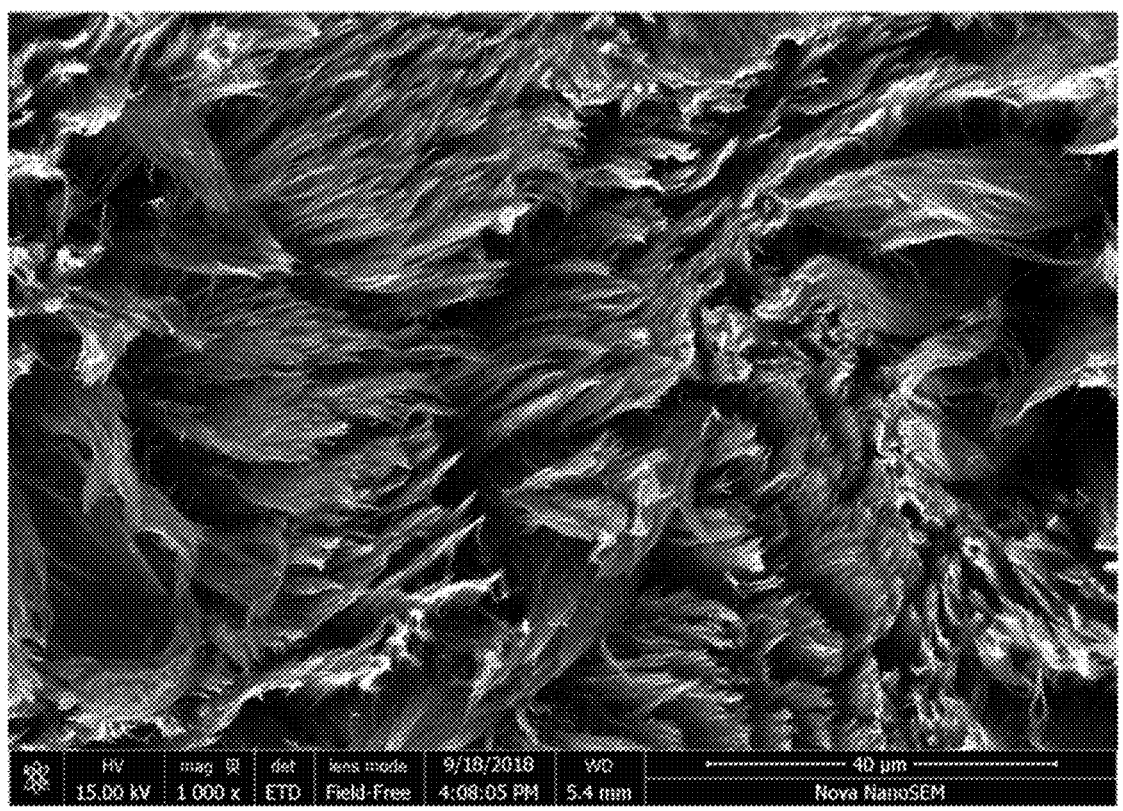
FIG. 9 is an SEM image of the carbon nanotube array in FIG. 8 after being repaired by the method in FIG. 5.

FIG. 8 shows a scanning electron micrograph (SEM) of the carbon nanotube array 20 before being repaired. It can be seen that a part of the plurality of the carbon nanotubes of the carbon nanotube array 20 before being repaired are inclined, and the surface of the carbon nanotube array is uneven. FIG. 9 shows an SEM of the carbon nanotube array in FIG. 8 after being repaired by the method in this embodiment. It can be seen that the plurality of carbon nanotubes of the carbon nanotube array are not inclined, and the surface of the carbon nanotube array is level. It illustrates that the method for repairing surface of carbon nanotube array in this embodiment can make the inclined carbon nanotubes of the carbon nanotube array become perpendicular to the substrate, thereby making the surface of the carbon nanotube array level.

The method for repairing surface of carbon nanotube array has many characteristics. First, the inclined carbon nanotubes of the carbon nanotube array can be straightened by an adhesive tape, thereby flattening the surface of the carbon nanotube array to improve the performance of the carbon nanotube array; the method for repairing surface of carbon nanotube array is simple in operation and low in cost. Second, the method first presses the carbon nanotube array into a carbon nanotube paper, since the surface of the carbon nanotube paper is level, after bonding with an adhesive tape and then peeling off the adhesive tape, all carbon nanotubes of the carbon nanotube array can become perpendicular to the substrate. Third, the method can facilitate storage and transportation of carbon nanotube arrays. Since the carbon nanotube paper has high mechanical strength and is not easily damaged, pressing the carbon nanotube array into carbon nanotube paper before storing and transporting the carbon nanotube array, bonding the carbon nanotube paper by an adhesive tape when in use or after reaching the transportation destination, and then peeling off the adhesive tape and repairing the carbon nanotube array, the carbon nanotubes of the carbon nanotube array after repairing are perpendicular to the substrate, and the surface of the carbon nanotube array after repairing is flat. Therefore, damage to the carbon nanotube array during storage and transportation can be reduced. Further, the substrate, the carbon nanotube paper and the adhesive tape are stacked and form a three-layer structure, which can avoid the carbon nanotube paper from bumping, squeezing and contamination during transportation.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A method for repairing surface of carbon nanotube array comprising:
   step (S11), providing a carbon nanotube array and a substrate, the carbon nanotube array being located on a surface of the substrate and comprising a plurality of carbon nanotubes aslant arranged on the surface of the substrate, wherein the carbon nanotube array comprises a top surface and an end surface, the end surface is located on and in direct contact with the surface of the substrate, all carbon nanotubes of the carbon nanotube array are oriented from the end surface to the top surface;
   step (S12), placing an adhesive tape on the top surface of the carbon nanotube array, a bond force between the plurality of carbon nanotubes and the substrate is greater than a bond force between the plurality of carbon nanotubes and the adhesive tape; and
   step (S13), peeling off the adhesive tape, no carbon nanotube of the carbon nanotube array is separated from the substrate, and the plurality of carbon nanotubes being aslant arranged on the surface of the substrate being pulled up vertically arranged on the surface of the substrate by a bond force of the adhesive tape.

2. The method of claim 1, wherein the carbon nanotube array is grown on the substrate directly.

3. The method of claim 1, wherein the carbon nanotube array is bonded to the substrate by an adhesive layer, and a bond force between the plurality of carbon nanotubes of the carbon nanotube array and the adhesive layer is greater than the bond force between the plurality of carbon nanotubes of the carbon nanotube array and the adhesive tape.

4. The method of claim 1, wherein during peeling off the adhesive tape, a peeling direction of the adhesive tape is perpendicular to the top surface of the carbon nanotube array.

5. The method of claim 1, wherein the step (S12) and the step (S13) are repeated for a plurality of times.

6. The method of claim 1, further comprising a step of plasma treating the top surface of the carbon nanotube array after the step (S13).

7. The method of claim 1, wherein in step (S13), after peeling off the adhesive tape, the carbon nanotubes of the carbon nanotube array form a super-aligned carbon nanotube array on the surface of the substrate, and the carbon nanotubes of the super-aligned carbon nanotube array are substantially parallel to each other and joined with each other by Van der Waals forces.

8. A method for repairing surface of carbon nanotube array comprising:
   step (S21), providing a carbon nanotube array and a substrate, the carbon nanotube array being located on and in direct contact with a surface of the substrate and comprising a plurality of carbon nanotubes, and at least part of the plurality of carbon nanotubes being aslant arranged on the surface of the substrate;
   step (S22), applying a pressure on a surface of the carbon nanotube array, to make the plurality of carbon nanotubes of the carbon nanotube array toppled over on the surface of the substrate and form a carbon nanotube paper comprising the plurality of carbon nanotubes, and the plurality of carbon nanotubes of the carbon nanotube paper being parallel to the surface of the substrate;
   step (S23), placing an adhesive tape on a surface of the carbon nanotube paper, a bond force between the plurality of carbon nanotubes of the carbon nanotube paper and the substrate is greater than a bond force between the plurality of carbon nanotubes of the carbon nanotube paper and the adhesive tape; and
   step (S24), peeling off the adhesive tape, the plurality of carbon nanotubes of the carbon nanotube paper being pulled up vertically and forms the carbon nanotube array on the surface of the substrate, wherein no carbon nanotube of the carbon nanotube paper is separated from the substrate, the at least part of the plurality of carbon nanotubes being aslant arranged on the surface of the substrate are pulled up vertically, and the plurality of carbon nanotubes of the carbon nanotube array are arranged vertically and substantially perpendicular to the surface of the substrate.

9. The method of claim 8, wherein the carbon nanotube array is bonded to the surface of the substrate by an adhesive layer, and a bond force between the plurality of carbon nanotubes of the carbon nanotube array and the adhesive layer is greater than the bond force between the plurality of carbon nanotubes of the carbon nanotube array and the adhesive tape.

10. The method of claim 8, wherein applying the pressure on the surface of the carbon nanotube array by a roller, and the roller rolls counterclockwise or clockwise on the surface of the carbon nanotube array.

11. The method of claim 8, wherein applying the pressure on the surface of the carbon nanotube array by a plate, and an angle between a direction of applying the pressure and the surface of the carbon nanotube array away from the substrate ranges from about 30 degree to about 60 degrees.

12. The method of claim 8, wherein applying the pressure on the surface of the carbon nanotube array is in one direction, and the plurality of carbon nanotubes of the carbon nanotube array are toppled over on the surface of the substrate is in one direction.

13. The method of claim 8, wherein during peeling off the adhesive tape, a peeling direction of the adhesive tape is perpendicular to the surface of the substrate.

14. The method of claim 8, further comprising a step of plasma treating a surface of the carbon nanotube array away from the substrate after step (S24).

15. The method of claim 8, wherein in step S(24), after peeling off the adhesive tape, the plurality of carbon nanotubes of the carbon nanotube array forms a super-aligned carbon nanotube array on the surface of the substrate, and the plurality of carbon nanotubes are substantially parallel to each other and joined with each other by Van der Waals forces.

\* \* \* \* \*